Oct. 7, 1952        G. M. JENKINS        2,612,713
AUTOMATIC FISHING DEVICE
Filed Aug. 8, 1950        2 SHEETS—SHEET 1
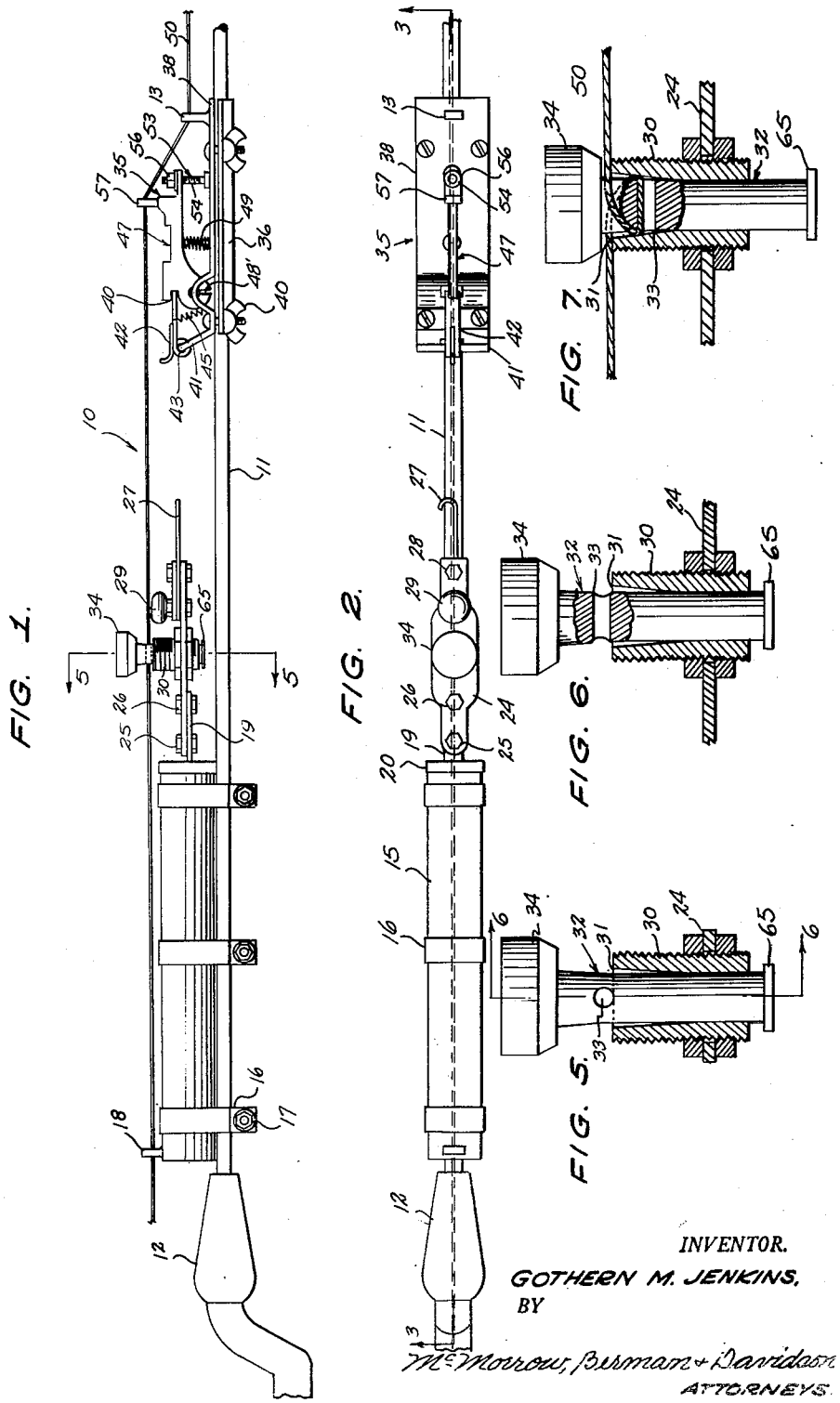
INVENTOR.
GOTHERN M. JENKINS,
BY
McMorrow, Burman & Davidson
ATTORNEYS Oct. 7, 1952          G. M. JENKINS          2,612,713

AUTOMATIC FISHING DEVICE

Filed Aug. 8, 1950          2 SHEETS—SHEET 2

INVENTOR.
GOTHERN M. JENKINS,
BY
McMorrow, Berman & Davidson
ATTORNEYS.

Patented Oct. 7, 1952

2,612,713

UNITED STATES PATENT OFFICE 2,612,713

AUTOMATIC FISHING DEVICE

Gothern M. Jenkins, Doniphan, Mo.

Application August 8, 1950, Serial No. 178,318

1 Claim. (Cl. 43—15)

This invention relates to an automatic fishing device for attachment to a fishing pole.

An object of this invention is to provide an automatic fishing device for attachment to a fishing line and pole which is particularly adapted to jerk the hook carried by the fishing line in response to a strike by a fish, to thereby securely hook the striking fish.

Another object of this invention is to provide an automatic fishing device for attachment to a fishing pole, which, after hooking a fish, resiliently supports the hooked fish to effectively prevent the fish from tearing loose from the hook.

A further object of this invention is to provide an automatic fishing device for attachment to a fishing line and pole which is particularly adapted to jerk the hook carried by the line in response to a select, predetermined pull exerted by a striking fish, to thereby securely hook said fish.

A still further object of this invention is to provide an automatic fishing device for attachment to a fishing pole which is relatively simple in structure and cheap to manufacture.

The above and still further objects and advantages of the invention will become apparent upon consideration of the following detailed description of the invention, when taken in conjunction with the accompanying drawings, wherein:

Figure 1 is a side elevational view of the automatic fishing device of the present invention, shown supported on a fishing pole contiguous to the handle thereof;

Figure 2 is a top plan view of the automatic fishing device of the present invention;

Figure 5 is an enlarged sectional view taken along the line 5—5 of Figure 1;

Figure 6 is a sectional view taken along the line 6—6 of Figure 5; and

Figure 7 is a sectional view taken substantially along the line 7—7 of Figure 1, showing the fishing line extended through and partially circumposed about the supporting lug.

Figure 3:
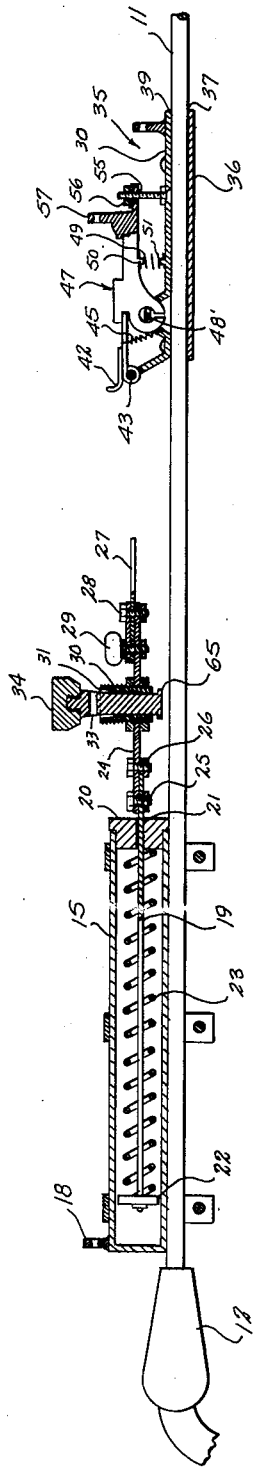
Figure 3 is a sectional view taken along the line 3—3 of Figure 2.
Figure 4:
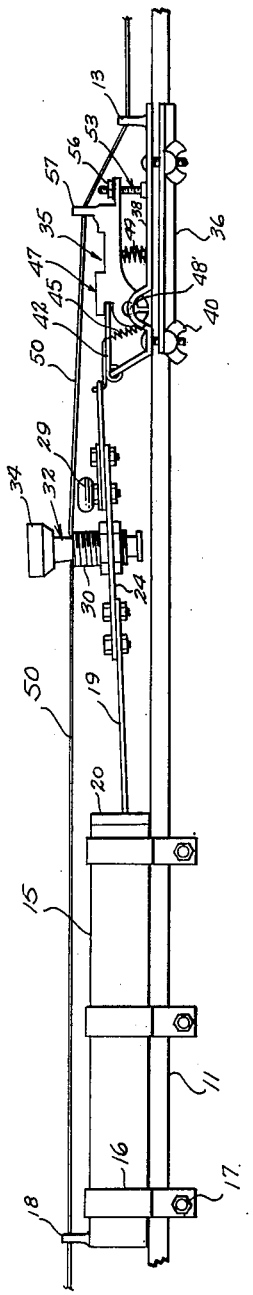
Figure 4 is a side elevational view of the automatic fishing device of the present invention, shown in position to be gripping in response to tensioning of the fishing line.

Referring now more particularly to the drawings, wherein like reference numerals have been used throughout the several views to designate like parts, there is shown the automatic fishing device of the present invention, generally designated by the reference numeral 10, attached to a fishing pole 11 including a handle 12 contiguous to one end thereof and the plurality of line guides arranged at spaced intervals longitudinally of the rod, one of the guides being designated by the reference numeral 13.

The automatic fishing device 10 embodies a hollow housing 15 having one end open and the other end closed. The housing is disposed longitudinally of the rod contiguous to the handle and is secured to the rod in overlying relation with respect to the latter by means of the spaced, U-shaped clamps, generally designated by the reference numeral 16. Each of the clamps 16 is detachably secured about the housing 15 and the adjacent portion of the rod 11 by means of the bolts 17.

Contiguous to the end of the housing 15 adjacent the handle 12 and secured thereto is a line guide 18.

Extending into the open end of the housing 15 is a plunger 19 which is supported in the housing 15 for movement longitudinally thereof into and out of an extended position with respect to the housing. As clearly shown in Figure 3, the open end of the housing 15 is provided with a closure plug 20 which is provided with a bore 21 arranged along the longitudinal axis of the housing for the extension therethrough of the adjacent portions of the plunger 19. Fixedly secured to the end of the plunger 19 disposed within the housing 15 is a head 22 for guidingly supporting the plunger for movement longitudinally of the housing. It is to be noted that the plunger 19 is fabricated of resilient material, and a slight clearance is provided between the bore 21 and the adjacent portion of the plunger 19, to thereby permit limited movement of the exteriorly disposed end of the plunger transversely of the housing 15 toward and away from the adjacent portion of the rod 11.

Disposed interiorly of the housing 15 and circumposed about the adjacent supported end of the plunger 19 is a coil spring 23 which normally biases the plunger out of its extended position.

Disposed exteriorly of the housing 15 in substantial alignment with respect to the plunger 19 is a plunger extension 24 which is detachably secured to the plunger 19 by means of the bolts 25 and 26. Contiguous to its free end, the plunger extension 24 is provided with a hook 27, the hook being secured to the plunger extension 24 by means of the bolt 28. Spaced inwardly from the hook 27 and supported on the plunger extension 24 is a finger piece 29 which can be manually grasped to urge the plunger extension 24 toward the adjacent portion of the fishing rod 11. Disposed intermediate the ends of the plunger extension 24 and secured transversely thereof is a plug body 30. The plug body is disposed transversely of the rod 11 and has its lower end terminating adjacent to and spaced from the latter.

The body 30 is provided with a longitudinally extended bore 31 which tapers inwardly from its upper end toward the lower end thereof. Supported within the bore 31 is a supporting plug 32 which is fabricated of a plastic or other similar material which will not swell upon contact with water. A plastic-containing material is most desirable, since metals often tend to cause excessive wear of fishing lines. The plug 32 is mounted in the bore for movement longitudinally thereof into and out of engagement with the bounding walls of the bore 31. The plug is shaped complementary to the bore 31 and is of a smaller diameter than the latter to thereby permit a line to be supported intermediate the bounding walls of the bore 31 and the outer periphery of the plug 32. Extending transversely of the plug 32 contiguous to its upper end there is provided a bore 33 for the extension therethrough of the adjacent portions of a fishing line 50. As clearly illustrated in Figures 5 to 7, inclusive, the lower end of the plug 32 is provided with an abutment 65 which is engageable with the adjacent portions of the rod 11 upon movement of the plug 32 into engagement with the bounding wall of the bore 31. Fixedly secured to the upper end of the plug 32 is a knob 34 for effecting the movement of the plug longitudinally of the plug body 30. Accordingly, upon extending the fishing line 50 through the transversely extending bore 33 and sliding the plug 32 longitudinally of the tapered bore 31, a tight engagement can be effected between the adjacent portions of the line 50, the outer periphery of the plug 32, and the bounding walls of the tapered bore 31. Upon manually grasping the finger piece 29 and urging the plunger extension 24 toward the line, the plug 32 can be urged out of its position in engagement with the bounding wall of the bore 31. Accordingly, the fishing line 50 can be speedily and easily fixedly secured with respect to the plunger 19 and the plunger extension 24.

Disposed adjacent to and spaced from the plunger extension 24 and supported on the rod 11 is a trigger mechanism, generally designated by the reference numeral 35. The trigger mechanism is engageable with the hook 27 of the plunger extension 24, and the line 50, for normally maintaining the plunger 19 in its extended position and for releasing the latter in response to tensioning of the fishing line 50. The trigger mechanism embodies a plate 36 which is adapted to underlie the rod 11 and is provided with a longitudinally extending arcuate groove 37 for engagement about the adjacent portions of the rod 11. Overlying the rod 11 in spaced, confronting relation with respect to the plate 36 is a second plate 38 which is similarly provided with a longitudinally extending, arcuate groove 39, the plates 36 and 38 being detachably secured together by means of wing nuts, generally designated by the numeral 40. Accordingly, the assembly of the plates 36 and 38 can be detachably secured to the rod 11 at any desired point along the length of the latter. The plate 38 has one of its ends provided with an upwardly inclined extension 41 which has its free end terminating in substantially the same plane as the hook 27. Positioned contiguous to the free end of the extension 41 is a hook 42 which is mounted on the extension 41 for pivotal movement about a transverse axis, designated by the reference numeral 43. Extending between the hook 42 and the plate 38 is a spring 45 which normally maintains the hook 42 in coplanar relation with respect to the hook 27.

Positioned contiguous to the hook 42 is a latch piece 47 which is pivotally supported on one of its ends on the plate 38 for rocking movement about a transverse axis 48' toward and away from the plate 38. The portion of the latch piece 47 contiguous to the hook 42 is provided with an inwardly extending slot 48 for engagement with the adjacent end of the hook 42. Accordingly, upon the application of a counterclockwise force to the latch piece 47, the bounding walls of the slot 48 will be brought out of their position of engagement with the hook 42, to permit the hook to rotate against the tensioning effect of the spring 45.

Intermediate its ends, the latch piece 47 is provided with a resilient mounting 49 which is illustrated as a coil spring circumposed about a downwardly depending lug 50 carried by the latch piece, and an upwardly extending lug 51 carried by the plate 38. Contiguous to its free end, the latch piece 47 is provided with a stop, generally designated by the reference numeral 53, for limiting the counterclockwise movement of the latch piece 47. As clearly illustrated in Figures 1 and 3, the stop embodies a threaded shank 54 having one end fixedly secured to the plate 38 and having the other end projecting upwardly through an aperture 55 provided in the adjacent portion of the latch piece 47. Overlying the latch piece 47 and threadedly engaging the adjacent end of the shank 54 is a nut 56. Accordingly, upon selectively positioning the nut 56 with respect to the shank 54, the counterclockwise movement of the latch piece 47 can be effectively limited.

Overlying the latch piece 47 and fixedly secured thereto is a line guide 57 which is normally spaced above the line guide 13. Accordingly, upon exerting a pulling force on the fishing line 50, the line guides 13 and 57 will cooperate to urge the latch piece 47 downwardly against the spring cushion 49. Upon clockwise movement of the latch piece 47 about its pivotal axis 48', the bounding walls of the notch 48 will be brought out of supporting engagement with respect to the adjacent end of the hook 42.

In actual use, the securement of the housing 15 to the rod 11 is effected by means of the clamps 16 and the bolt 17. Similarly, the securement of the trigger mechanism 35 is effected by means of the nut-and-bolt assemblies 40. The fishing line 50 is then extended through the various line guides 13 disposed longitudinally of and inwardly of the casting end of the rod 11, upwardly through the line guide 57, rearwardly through the bore 33 of the plug 32, through the line guide 13, and thence through the reel structure, not shown. The fishing line 50 is then cast, whereupon the knob 34 is manually grasped and pushed downwardly, causing the plug 32 to be engaged by the plug body 30, to thereby detachably secure the line 50 to the plunger 19 and the extension thereof. It is to be noted that the securement of the line 50 can be effected, as shown in Figure 7, by imparting a half-turn in either direction to the line-locking plug 32 prior to depression into the plug body. The additional engagement between the portions of the line circumposed about the plug 32 with the adjacent bounding walls of the tapered bore 31 will insure a better securement of the line 50 to the plunger extension 24.

The hook 27 of the plunger extension 24 is then urged toward the hook 42 of the trigger mechanism 35 and engaged upon the latter. The movement of the hook 27 toward the hook 42 will elongate the spring 23 and thereby place the plunger under the effect of a force directed toward the handle 12 of the rod 11. During fishing, when a fish strikes, a pull is exerted on the line 50 which will effect the movement of the latch piece 47 in a clockwise direction about the pivotal axis 48', to thereby bring the bounding walls of the notch 48 out of engagement with the hook 42. Upon effecting the release of the latch piece 47, the large coil spring 23 jerks the plunger 19 and the secured line 50 inwardly toward the handle 12 to thereby securely hook the striking fish.

The requisite tensioning required to trip the trigger mechanism 35 can be selectively adjusted by means of the stop 53 which limits the positioning of the latch piece 47. It is readily apparent that the engagement between the notch 48 and the hook 42 becomes more critical as the latch piece 47 is moved clockwise about its pivotal axis 48'. Accordingly, upon moving the nut 56 downwardly along the threaded shank 54, the automatic fishing device can be made to respond to very small tensioning forces.

In the event that the fisherman desires to free-reel, it is merely necessary to manually grasp the finger piece 29 and urge the plunger extension 24 toward the rod 11. This movement will effectively urge the plunger 32 upwardly out of its position of engagement within the plug body 30, to thereby release the line 50 for free movement within the line guides 13 and 57, and 18.

Although only one embodiment of the automatic fishing device of the present invention has been described, it is readily apparent that numerous modifications can be made without departing from the spirit of the invention as set forth in the appended claim.

What I claim is:

In combination, a fishing rod, a fishing line extending longitudinally along a side of the rod, a hooking mechanism secured to said rod including a spring retracted plunger and a trigger, said plunger being laterally flexible and said trigger being operatively engaged with the line, and means on said plunger for releasably connecting the line to said plunger, said means comprising a tubular plug body secured to and extending crosswise of said plunger and normal to the fishing rod, and a plug positioned in and movable endwise in said plug body from an inward position in which a portion of said plug and a portion of said plug body clamp the line therebetween and operatively connect the line with said plunger to an outward position in which the line is disconnected from the plunger and is free to be operated independently of the hooking mechanism, said plunger being flexible toward the fishing rod to engage the inward end of said plug with the fishing rod to move said plug outwardly relative to the plug body for releasing the plug and plug body from clamping engagement with the fishing line.

GOTHERN M. JENKINS.

REFERENCES CITED

The following references are of record in the file of this patent:

UNITED STATES PATENTS

| Number | Name | Date |
| --- | --- | --- |
| 75,750 | Gridley | Mar. 24, 1868 |
| 154,141 | Hill | Aug. 18, 1874 |
| 671,914 | Nesbit | Apr. 9, 1901 |
| 891,044 | Darnell | June 16, 1908 |
| 1,989,407 | Ezell | Jan. 29, 1935 |
| 2,481,453 | Stadelhofer | Sept. 6, 1949 |
| 2,525,067 | Dungan | Oct. 10, 1950 |
| 2,552,516 | Camp | May 15, 1951 |